May 27, 1924.

G. C. CARHART

CLUTCH OPERATING MECHANISM

Filed June 6, 1918

INVENTOR
George C. Carhart.
BY
Parsons & Bodell
ATTORNEYS

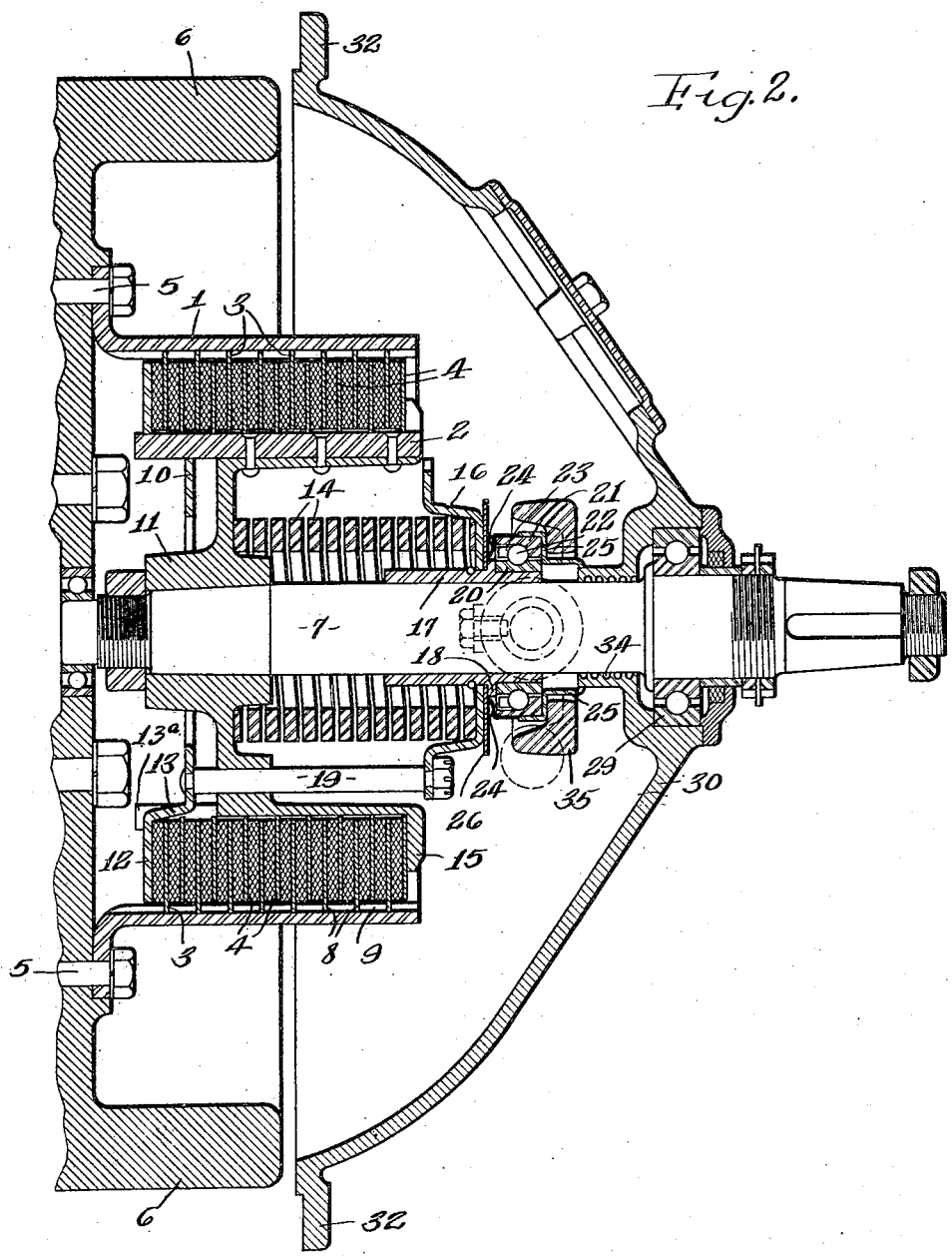

Patented May 27, 1924.

1,495,574

UNITED STATES PATENT OFFICE.

GEORGE C. CARHART, OF SYRACUSE, NEW YORK, ASSIGNOR TO THE BROWN-LIPE GEAR COMPANY, OF SYRACUSE, NEW YORK, A CORPORATION OF NEW YORK.

CLUTCH-OPERATING MECHANISM.

Application filed June 6, 1918. Serial No. 238,416.

*To all whom it may concern:*

Be it known that I, GEORGE C. CARHART, a citizen of the United States, and a resident of Syracuse, in the county of Onondaga and State of New York, have invented a certain new and useful Clutch-Operating Mechanism, of which the following is a specification.

This invention has for its object means for controlling the shifting of the clutch of a motor vehicle which means is particularly simple in construction and highly efficient and durable in use; and it consists in the novel features and in the combinations and constructions hereinafter set forth and claimed.

In describing this invention, reference is had to the accompanying drawings, in which like characters designate corresponding parts in all of the views.

Figure 2 is a sectional view on the plane of line 2—2, Figure 1.

Figure 1:
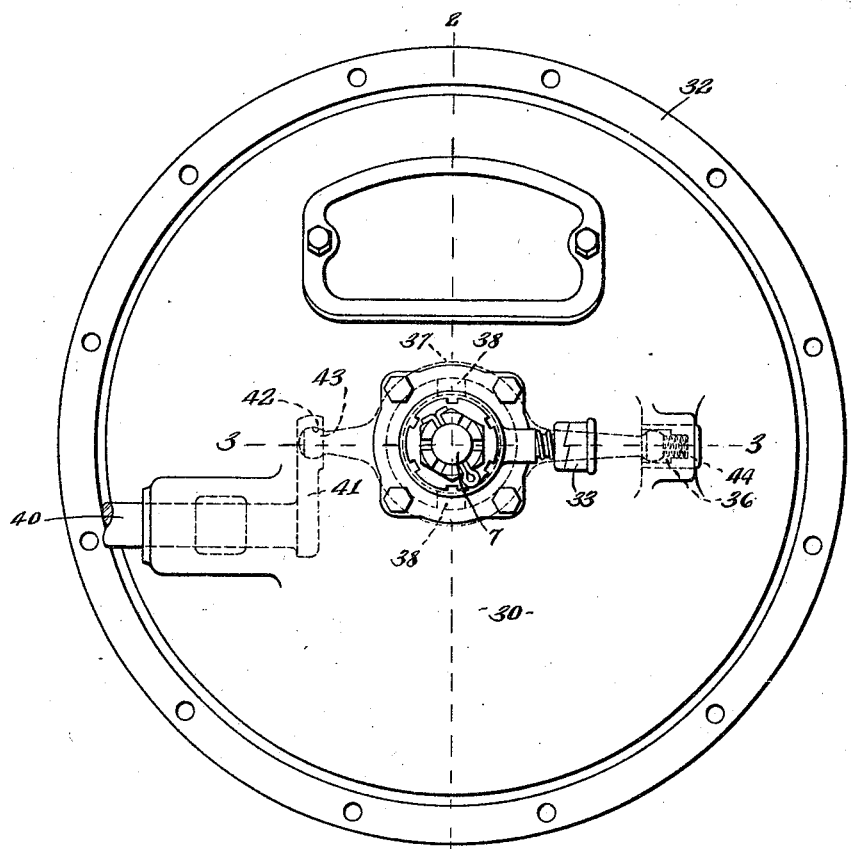
Figure 1 is an end elevation of a clutch embodying my invention.
Figure 3:
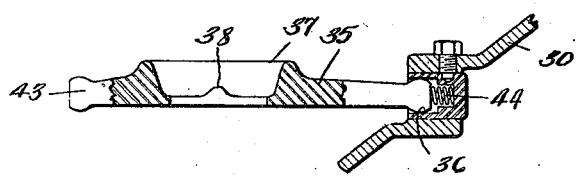
Figure 3 is an enlarged sectional view, partly in elevation on the plane of line 3—3, Figure 1.

The clutch here illustrated is of the disk type and includes driving and driven members 1 and 2, interleaved disks 3, 4, connected respectively to said members and an axially shiftable element operable to compress and frictionally engage the disks. The driving and driven members 1 and 2 may be of any suitable form, size and construction and as here illustrated, the driving member 1 is a cylindrical shell secured at 5 to a member, as the fly wheel 6 of the engine; and the driven member 2 is mounted within the member 1 on the driven shaft 7.

The disks 3 and 4 are interlocked respectively with the members 1 and 2, and as here shown, are provided respectively with external and internal tongues which extend into grooves or keyways formed respectively in the inner and outer faces of the elements 1 and 2, such as the tongues 8 of the disks 3, which slide in grooves or keyways 9 in the member 1.

10 designates the axially shiftable element which includes a body encircling the hub 11 of the driven member 2 and an abutment ring 12 connected to the body by arms 13 extending through slots 13ª in the member 2. The ring 12 normally compresses the disks 3, 4 under the influence of a main spring 14 toward a fixed abutment 15 on the driven member 2. The abutment element 10 is shiftable axially in one direction to compress the disks by means of the spring 14 which is interposed between the body or web portion of the driven member 2 and a spring seat 16. 17 is an axially shiftable element carrying said spring seat and slidable axially on the shaft 7. The axially shiftable element 17 comprises a rotatable sleeve provided with an annular shoulder 18 which receives the thrust of the spring seat 16 and a bearing for receiving the thrust of the operating means to be described. The movement of the element 18 is transmitted to the element 10 in one direction by means of rods 19 connecting the abutment 16 and the element 10 and slidable in the driven element 2. When the axially shiftable element 17 is moved to the left against the spring 14, the element 10 which compresses the disks is relieved of the tension of the spring 14 so that the disks will disengage.

The thrust bearing of the axially shiftable element 17 consists of inner and outer rings 20, 21 and antifriction members, as balls 22, located between the rings and also a ball retainer 23. The outer ring 21 through the balls 22 transmits the axial shifting movement to the sleeve when the operating means is actuated to shift the sleeve. Suitable caps 24, 25 enclose the bearing to make it oil-tight and a washer 26 is interposed between the spring seat 16 and the shoulder 18.

The driven shaft 7 is journaled at its outer end in an antifriction bearing 29 formed in the casing cover or section 30 which is secured to the main casing of the clutch by bolts passing through holes in the marginal flange 32 of said cover 30, this cover being removable and replaceable by movement in a direction axially of the clutch.

The bearing 29 is oiled by means of a grease cup 33 and some of the lubricant is fed along the shaft to the sleeve 17 and the bearing therefor by means of internal spiral grooves 34 formed in the inner face of the hub of the cover 30 and the caps 24, 25 previously referred to retain the oil or lubricant.

The means for controlling the operation of the shiftable element 17, that is, for operating it axially to the left against the tension of the spring 14, comprises a lever 35 fulcrumed at one end and having means coacting with the shiftable element 17 and an operating member coacting with the lever. As here shown, the lever is connected to the operating member and at its fulcrum point to the casing 30 by ball and socket joints, and is pressed lengthwise in one direction by a spring located at one of said joints. The lever here illustrated is shown as fulcrumed at one end in a socket 36 located on the inner face of the cover 30, and as having a collar 37 between its ends having diametrically disposed shoulders 38 which act on the shiftable element 17, the internal face of the collar being spaced apart from the periphery of the portion of the shiftable element 17 or the driven shaft located within said collar. The operating member coacts with the lever on the opposite side of the driven element from that on which its fulcrumed end is located. As here shown the collar encircles the grease retaining cap 25 and the diametrically disposed shoulders bear directly against the portion of said cap interposed between the collar and the rear face of the outer ring 21 of the bearing for the sleeve of the axially shiftable element 17.

The operating member consists of a rock shaft 40 journaled in a bearing extending through the cover 30 on the casing and having a rock arm 41 thereon formed with a socket 42 for receiving a ball 43 at the contiguous end of the lever 35, the rock arm coacting with the lever on the opposite side of the driven element to the point at which the lever is fulcrumed and said arm supports the lever with the inner face of the collar spaced apart from the underlying surface of the element 17. The lever is pressed lengthwise by means of a spring 44 located in the socket 36 and tending to press the lever to hold the ball 43 in the socket 42 of the operating member 41. This socket 36 extends into an opening formed in the casing cover 30 and is held therein by a set screw. The shaft 40 is rocked by means of a suitable pedal.

In operation, during the rocking of the rock shaft, the lever is moved about its fulcrum point and shifts the sleeve of the element 17 inwardly to the left against the compression of the spring 14, thus relieving the abutment member 10 of the tension of the spring so that the disks 3 and 4 disengage.

This construction of operating means for clutches is particularly advantageous in that it is simple in construction and readily accessible and the parts are held from any looseness and with minimum friction.

Furthermore, the cover 30 and rock arm 41 are readily detached from the lever 35 when the cover 30 is being removed.

What I claim is:

1. In a clutch, an axially shiftable element, mechanism for controlling said element, and a casing including a removable cover at its rear end removable and replaceable in a direction lengthwise of the axis of the clutch, said mechanism comprising a lever engaged with the shiftable element and fulcrumed to the cover and an operating member carried by the cover, and means for detachably connecting the lever to the cover and the operating member, substantially as and for the purpose specified.

2. In a clutch an axially shiftable element, means for controlling said element, and a casing including a removable cover, said means comprising a lever coacting with the shiftable element and fulcrumed to the cover, and a rock shaft journaled in the cover and having an arm coacting with said lever, substantially as and for the purpose set forth.

3. In a clutch, an axially shiftable element, means for controlling said element, and a casing including a removable cover, said means comprising a lever engaged with the shiftable element and detachably fulcrumed to the cover, and means for operating the lever carried by the cover and detachably connected to the lever, the lever being shiftable endwise for facilitating such detachment, substantially as and for the purpose specified.

4. In a clutch, an axially shiftable element, means for controlling said element, and a casing including a removable cover, said means comprising a lever engaged with the shiftable element and detachably fulcrumed to the cover, and means for operating the lever carried by the cover and detachably connected to the lever, the lever being shiftable endwise for facilitating such detachment, and a spring normally tending to resist said endwise movement, substantially as and for the purpose set forth.

5. In a clutch, an axially shiftable element, means for controlling said element, and a casing including a removable cover formed with a socket, said means comprising a member coacting with the shiftable element and an operating member, the former member being a lever fulcrumed at one end in the socket, and the latter a rock arm carried by the cover and formed with a socket for receiving the other end of the lever, one of said members being shiftable endwise to detach the lever from the rock arm and the cover, substantially as and for the purpose described.

6. In a clutch, an axially shiftable element, means for controlling said element, and a casing including a removable cover formed with a socket, said means comprising a lever coacting with the shiftable element and detachably fulcrumed in the socket, a rock arm carried by the cover and formed with a socket for receiving the other end of the lever, one of said parts being shiftable endwise to detach the lever from the rock arm and the cover, and a spring for resisting said endwise movement, substantially as and for the purpose specified.

7. In a clutch, an axially shiftable element, means for controlling said element, and a casing including a removable cover formed with a socket, said means comprising a lever coacting with the shiftable element and detachably fulcrumed in the socket, a rock arm carried by the cover and formed with a socket for receiving the other end of the lever, the lever being shiftable endwise to facilitate the detachment of the lever from the rock arm and the cover, and a spring for normally resisting such endwise movement, substantially as and for the purpose set forth.

8. In a clutch, an axially shiftable element, and means for controlling the shifting of said element comprising a lever fulcrumed at one end and having a collar between its ends concentric with said element and having its inner face spaced apart from the periphery of the underlying portion of the clutch, and an operating member coacting with said lever at the other end thereof and supporting the same with the inner face of the collar spaced apart from the periphery of the underlying portion of the clutch, substantially as and for the purpose described.

9. In a clutch, an axially shiftable element, and means for controlling the shifting of said element including a lever fulcrumed at one end and coacting with the shiftable element between its ends, an operating member coacting with and supporting the other end of the lever, and a spring acting on the lever to press the same toward the operating member, substantially as and for the purpose specified.

10. In a clutch, an axially shiftable element and means for controlling the shifting of said element comprising a lever coacting with said element, a fixed socket in which one end of the lever is fulcrumed, an operating member having a socket in which the other end of the lever is located, and a spring in one of the sockets tending to move the lever endwise, substantially as and for the purpose set forth.

11. In a disk clutch, an axially shiftable element, and means for controlling the shifting of said element including a lever having a collar between its ends concentric with said element and having its inner face spaced apart from the periphery of the portion of the clutch within the collar, a fixed socket, the lever having a ball at one end seated in the socket, a rocking operating member coacting with the other end of the lever and connected thereto by a ball-and-socket joint and a spring located in the first-mentioned socket and tending to press the lever endwise, substantially as and for the purpose described.

12. In a clutch, an axially shiftable element, means for controlling said element, and a casing including a removable cover, said means comprising a lever engaged with the shiftable element and detachably fulcrumed to the cover, and a rock arm carried by the cover and detachably connected to the lever, substantially as and for the purpose specified.

13. In a clutch, an axially shiftable element, means for controlling said element, and a casing including a removable cover formed with a socket, said means comprising a lever having an end fulcrumed in the socket, the lever extending crosswise of the axially shiftable element, a rock arm carried by the cover and connected to the lever by a ball-and-socket joint, and a spring located in the first mentioned socket and tending to move the lever endwise, the lever being movable endwise against the spring to disengage said lever from the rock arm, substantially as and for the purpose set forth.

In testimony whereof, I have hereunto signed my name, at Syracuse, in the county of Onondaga, and State of New York, this 16th day of May, 1918.

GEORGE C. CARHART.